United States Patent [19]

Weber et al.

[11] Patent Number: 5,453,463
[45] Date of Patent: Sep. 26, 1995

[54] MOLDING MATERIALS BASED ON POLYARYL ETHERS AND TOUGHENED PARTLY AROMATIC COPOLYAMIDES

[75] Inventors: Martin Weber, Neustadt; Klaus Muehlbach, Gruenstadt, both of Germany

[73] Assignee: BASF Aktiengesellschaft, Ludwigshafen, Germany

[21] Appl. No.: 318,192

[22] Filed: Oct. 5, 1994

Related U.S. Application Data

[63] Continuation of Ser. No. 124,046, Sep. 21, 1993, abandoned.

[30] Foreign Application Priority Data

Sep. 23, 1992 [DE] Germany ............ 42 31 811.4
Oct. 14, 1992 [DE] Germany ............ 42 34 602.9

[51] Int. Cl.⁶ .................... C08L 77/10; C08L 81/06
[52] U.S. Cl. ................. 525/66; 525/425; 525/444
[58] Field of Search ................ 525/425, 66, 444

[56] References Cited

U.S. PATENT DOCUMENTS 3,729,527  4/1973  Nield ..................... 260/857
4,990,564  2/1991  Taubitz ................... 525/66
5,104,924  4/1992  Goetz ..................... 524/508

FOREIGN PATENT DOCUMENTS 327979   6/1989  European Pat. Off. .
0477757  4/1992  European Pat. Off. .
4121705  1/1993  Germany .

*Primary Examiner*—James J. Seidleck
*Assistant Examiner*—I. Zemel
*Attorney, Agent, or Firm*—Keil & Weinkauf

[57] ABSTRACT

Molding materials are composed of
  A) from 5 to 95% by weight of polyaryl ethers,
  B) from 5 to 95% by weight of a mixture (B) of
    $B_I$) from 75 to 97% by weight of partly aromatic polyamides and
    $B_{II}$) from 3 to 25% by weight of a rubber impact modifier
  and furthermore
  C) from 0 to 40% by weight of additives and/or processing assistants.

8 Claims, 1 Drawing Sheet

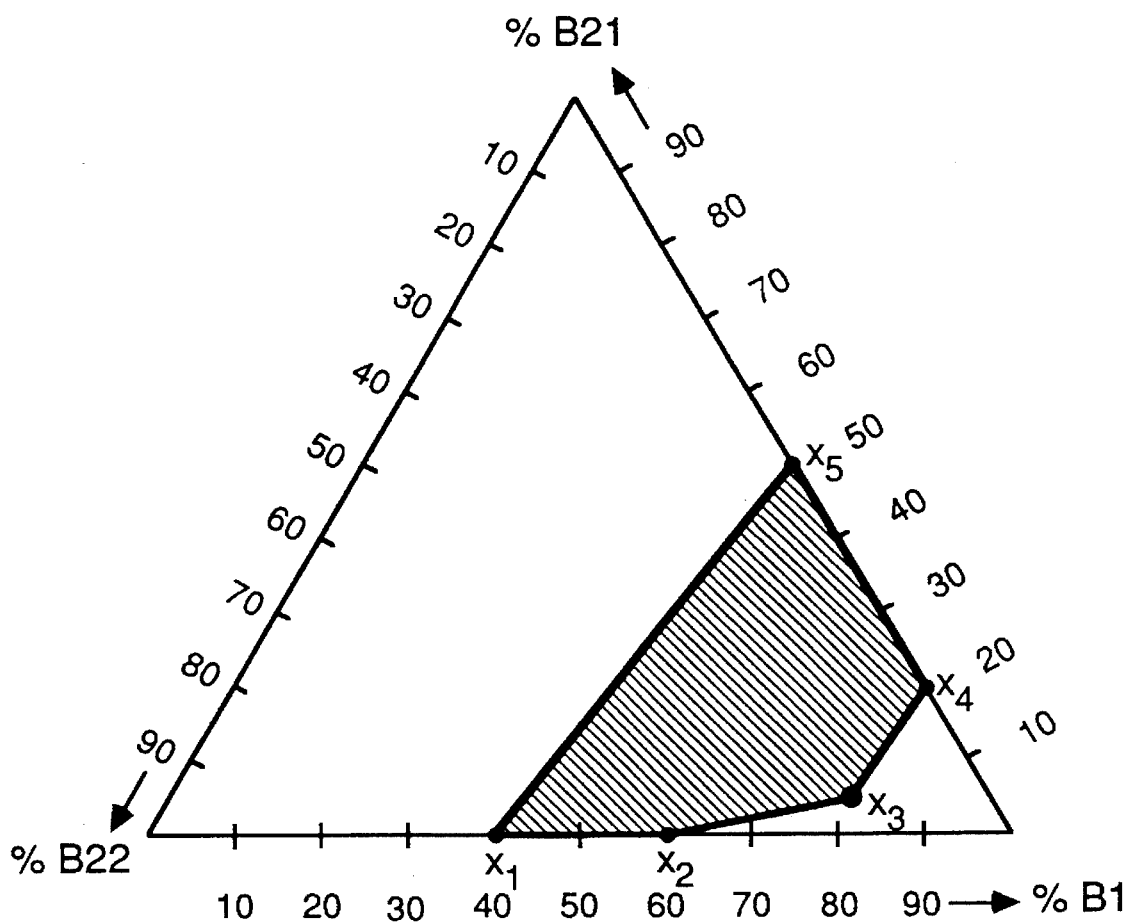

MOLDING MATERIALS BASED ON POLYARYL ETHERS AND TOUGHENED PARTLY AROMATIC COPOLYAMIDES

This application is a continuation of application Ser. No. 08/124,046, filed on Sep. 21, 1993, now abandoned.

The present invention relates to molding materials composed of

A) from 5 to 95% by weight of polyaryl ethers (A) having repeating structural elements

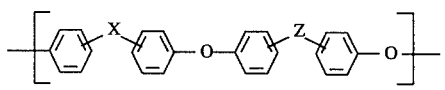

or the $C_1$-$C_6$-alkyl, $C_1$-$C_6$-alkoxy, aryl, chlorine or fluorine derivatives thereof which are substituted in the nucleus, where X may be —$SO_2$—, —SO—, —S—, —O—, —CO—, —N=N—, —RC=$CR^a$—, —$CR^bR^c$— or a chemical bond, Z is selected from the group consisting of —$SO_2$—, —SO—, —CO—, —N=N— and —RC=$CR^a$—, R and $R^a$ are each hydrogen or $C_1$-$C_6$-alkyl and $R^b$ and $R^c$ may each be hydrogen or $C_1$-$C_6$- alkyl, $C_4$-$C_{10}$ -cycloalkyl, $C_1$-$C_6$-alkoxy or aryl or a fluorine or chlorine derivative of each of these, B) from 5 to 95% by weight of a mixture (B) of $B_I$) from 75 to 97% by weight of partly aromatic polyamides having a triamine content of less than 0.5% by weight and $B_{II}$) from 3 to 25% by weight of polymeric impact modifiers and furthermore C) from 0 to 40% by weight of additives and/or processing assistants.

The present invention furthermore relates to the use of these molding materials for the production of moldings, films or fibers, and to moldings, films or fibers which are obtainable using the molding materials as essential components.

Mixtures of polysulfones and aromatic and/or aliphatic polyamides are disclosed in DE 21 22 735 and in the previously unpublished German Patent Application No. 4 121 705.5. It was also known that such blends may contain elastomeric materials, such as ethylene copolymers, with the result that the articles produced therefrom are tougher. However, the toughness of these blends is not sufficient for many requirements. Moreover, their rigidity is too low.

It is an object of the present invention to provide molding materials which are based on polyaryl ethers and polyamides and, in addition to high heat distortion resistance and good toughness, also have high rigidity.

We have found that this object is achieved and that the molding materials defined at the outset and based on polyaryl ethers and toughened partly aromatic polyamides exhibit the desired property spectrum.

Component A

The novel molding materials are composed of from 5 to 95% by weight of component A. Molding materials which contain from 15 to 85% by weight of this component are particularly preferred.

Polyaryl ethers having repeating structural elements

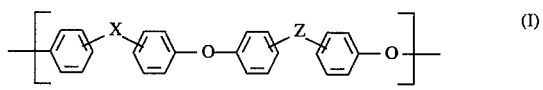

are used as component A. Derivatives thereof which are substituted in the nucleus may also be used. Preferred substituents are $C_1$-$C_6$-alkyl, such as methyl, ethyl or tert-butyl, $C_1$-$C_6$-alkoxy, such as methoxy or ethoxy, aryl, in particular phenyl, chlorine and fluorine. X may be —$SO_2$—, —SO—, —S—, —O—, —CO—, —N=N—, —RC=$CR^a$—, —$CR^bR^c$— or a chemical bond. Z may be —$SO_2$—, —SO—, —N=N— or —RC=$CR^a$—. Here, R and $R^a$ are each hydrogen, $C_1$-$C_6$-alkyl, eg. methyl, n-propyl or n-hexyl, $C_1$-$C_6$-alkoxy, including methoxy, ethoxy or butoxy, or aryl, in particular phenyl. $R^b$ and $R^c$ may each be hydrogen or $C_1$-$C_6$-alkyl, in particular methyl. However, they may also be bonded to one another to form a $C_4$-$C_{10}$-cycloalkyl ring, which in turn may be substituted by one or more alkyl groups, preferably methyl. In addition, $R^b$ and $R^c$ may also be $C_1$-$C_6$-alkoxy, eg. methoxy or ethoxy, or aryl, in particular phenyl. The abovementioned groups may in turn each be substituted by chlorine or fluorine.

The polyaryl ethers may contain any terminal groups, such as halogen, methoxy, hydroxyl, phenoxy, benzyloxy or amino terminal groups.

The number average molecular weights ($\bar{M}_n$) of suitable polyaryl ethers A are in general from 1,500 to 60,000 g/mol.

The suitable polyaryl ethers A include copolymers composed of polyaryl ether segments and structural units selected from the group consisting of the polyesters, aromatic polycarbonates, polyestercarbonates, polysiloxanes, polyimides, polyamidoimides and polyetherimides. The molecular weights of the polyaryl ether blocks or of the polyaryl ether grafts in such copolymers are in general 1,000–30,000 g/mol. The blocks having different structures may be arranged alternately or randomly in the copolymers. The amount by weight of the polyaryl ethers in the copolymers is in general from 3 to 97, preferably from 10 to 90, in particular from 20 to 80, % by weight.

The particularly preferred polyaryl ethers A include those containing $a_1$) from 3 to 97 mol % of repeating units

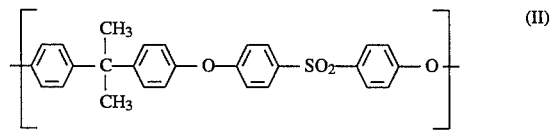

and $a_2$) from 3 to 97 mol % of repeating units

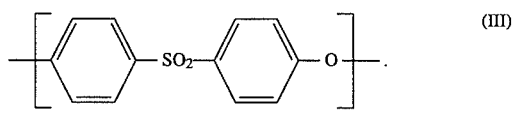

in particular those containing from 5 to 95 mol % of units II and from 5 to 95 mol % of units III, the stated molar percentages being based on the content of $SO_2$ groups.

Mixtures of different polyaryl ethers A may also be used.

Preferred mixtures among these are those which contain, as component $A_I$, polyaryl ethers which contain terminal amino groups and, as component $A_{II}$, polyaryl ethers having terminal groups which are not amino groups. The polyaryl ethers containing terminal amino groups may be present in the mixtures in an amount from 0.5 to 50, preferably from 1 to 30, % by weight, based on the total polyaryl ether content. Mixtures of from 2 to 15% by weight of polyaryl ethers $A_I$ and from 85 to 98% by weight of polyaryl ethers $A_{II}$ are particularly preferred.

The polyaryl ethers $A_I$ may contain both $NH_2$ groups as terminal groups and alkyl- or aryl-substituted and dialkyl- or diaryl-substituted amino groups, among which $C_1$-$C_5$-alkylamino, such as methylamino, ethylamino or n-propylamino, or phenylamino groups are preferred. A very particularly preferred terminal amino group is $NH_2$—. In general, the polyaryl ethers $A_I$ have from 0.05 to 1% by weight, based on all terminal groups, of terminal amino groups. However, the amount may also be lower or higher, for example from 0.03 to 2% by weight. Contents of terminal amino groups which are less than 0.01 or more than 5% by weight generally have no advantages.

The preparation of the polyaryl ethers A is generally known (cf. for example GB 1 152 035; U.S. Pat. No. 4,870,153; WO 84 03891), as is the preparation of polyaryl ethers having a block structure (DE 37 42 264). Methods for the synthesis of copolymers are described, for example, in A. Noshay et al., Block Copolymers, Academic Press, 1977.

Suitable process conditions for the synthesis of polyaryl ethers are described, for example, in EP-A 113 112 and 135 130.

The reaction of monomeric dihydroxy compounds with dihalo compounds in aprotic polar solvents in the presence of an anhydrous alkali metal carbonate is particularly suitable. A particularly preferred combination is N-methylpyrrolidone as solvent and potassium carbonate as base, or the reaction is particularly preferably carried out in the melt. The reaction of acyl chlorides with aromatic compounds having abstractable hydrogen atoms in the presence of Lewis acids, such as aluminum trichloride, is also suitable.

The preparation of polyaryl ethers having different terminal groups is also known per se. Thus, the synthesis of polyaryl ethers containing terminal amino groups is described, for example, in J. E. McGrath et al., Polymer 30, (1989), 1552. For example, polyaryl ethers having terminal phenylamino groups can be prepared by adding p-aminophenol to the reaction mixture during the polymerization.

The content of terminal amino groups in the polyaryl ethers $A_I$ can be determined, for example, by known analytical methods, such as potentiometric titration.

Component B

The novel molding materials contain, as a further component, from 5 to 95, preferably from 15 to 85, % by weight of a mixture of partly aromatic copolyamides ($B_I$) and polymeric impact modifiers ($B_{II}$).

According to the invention, these mixtures contain from 75 to 97, preferably from 80 to 95, % by weight of partly aromatic copolyamides and from 3 to 25, preferably from 5 to 20, % by weight of a polymeric impact modifier.

The partly aromatic copolyamides $B_I$ can be prepared by copolycondensation of aliphatic and aromatic polyamides or of the monomer building blocks thereof, for example copolymers of adipic acid, isophthalic acid or terephthalic acid and hexamethylenediamine.

The suitable copolyamides include those which are composed of
B1: from 20 to 90% by weight of units which are derived from terephthalic acid and hexamethylenediamine and
B2: from 10 to 80% by weight of units of at least one of the building blocks B21, B22 and/or B23, ie.
B21: up to 50% by weight of units which are derived from ε-caprolactam,
B22: up to 80% by weight of units which are derived from adipic acid and hexamethylenediamine and/or
B23: up to 40% by weight of units of further polyamide-forming monomers.

For stabilization against oxidative and thermal degradation, up to 2% by weight of at least one aromatic, secondary amine and/or up to 2,000 ppm of at least one phosphorus-containing inorganic acid or of a derivative thereof may furthermore be added to the copolyamide or to the blend to be prepared from components A and B (stabilizers), the amount of stabilizers being based on the proportionate amount of copolyamide.

The amount of units which are derived from ε-caprolactam is preferably from 20 to 50, in particular from 25 to 40, % by weight, while the amount of units which are derived from adipic acid and hexamethylenediamine is preferably from 30 to 75, in particular from 35 to 60, % by weight.

The copolyamides may contain both units of ε-caprolactam and units of adipic acid and hexamethylenediamine; the amount of such units, which are free of aromatic groups, is at least 10, preferably at least 20, % by weight. The units which are derived from ε-caprolactam and those which are derived from adipic acid and hexamethylenediamine may be present in any ratio.

BRIEF DESCRIPTION OF THE DRAWING

The drawing sets forth a ternary diagram of the preferred copolyamindes.

Preferred copolyamides are those whose composition in a ternary diagram (cf. FIG. 1) is within the pentagon described by apices $X_1$ to $X_5$, the points $X_1$ to $X_5$ being defined as follows:
$X_1$: 40% by weight of units B1
60% by weight of units B22
$X_2$: 60% by weight of units B1
40% by weight of units B22
$X_3$: 80% by weight of units B1
5% by weight of units B21
15% by weight of units B22
$X_4$: 80% by weight of units B1
20% by weight of units B21
$X_5$: 50% by weight of units B1
50% by weight of units B21

Polyamides which contain from 50 to 80, in particular from 60 to 75, % by weight of units which are derived from terephthalic acid and hexamethylenediamine (units B1) and from 20 to 50, preferably from 25 to 40, % by weight of units which are derived from ε-caprolactam (units B21) have proven particularly advantageous for many intended uses.

In addition to the units B1 to B22 described above, the partly aromatic copolyamides may contain up to 40, preferably 10–30, in particular 20–30, % by weight of further polyamide-forming monomers B23, as are known in the case of other polyamides.

For example, aromatic dicarboxylic acids, such as isophthalic acid, substituted terephthalic and isophthalic acids, eg. 3-tert-butylisophthalic acid, and polynuclear dicarboxylic acids, eg. 4,4'-biphenyldicarboxylic acid, 4,4'-diphenylmethanedicarboxylic acid, diphenylsulfonyl-4,4'- and -3,3'-dicarboxylic acid, 1,4- or 2,6-naphthalenedicarboxylic acid and phenoxyterephthalic acid, are suitable for introducing the building blocks B23, isophthalic acid being particularly preferred.

Other suitable polyamide-forming dicarboxylic acids are aliphatic dicarboxylic acids of 4 to 16 carbon atoms and other suitable polyamide-forming diamines are aliphatic or cycloaliphatic diamines of 4 to 16 carbon atoms, which differ from those of components B1, B21 and B22. Examples of suitable monomers of this type are suberic acid, azelaic acid and sebacic acid, and 1,4-butanediamine, 1,5-pentanediamine, piperazine, 4,4'-diaminodicyclohexylmethane, 2,2-(4,4'-diaminodicyclohexyl)-propane or 3,3'-dimethyl-4,4'-diaminodicyclohexylmethane. Capryllactam, enantholactam, ω-aminoundecanoic acid and laurolactam are suitable from the group consisting of the lactams or aminocarboxylic acids.

The following compositions of component $B_I$ are particularly preferred.

B1: from 65 to 85% by weight of units which are derived from terephthalic acid and hexamethylenediamine and
B23: from 15 to 35% by weight of units which are derived from isophthalic acid and hexamethylenediamine or B1: from 50 to 70% by weight of units which are derived from terephthalic acid and hexamethylenediamine and
B22: from 10 to 20% by weight of units which are derived from adipic acid and hexamethylenediamine and
B23: from 20 to 30% by weight of units which are derived from isophthalic acid and hexamethylenediamine.

If B23 contains 4,4'-substituted symmetric dicarboxylic acids, it is advisable to convert these into ternary Copolyamides with B1 and B21 or B1 and B22 since otherwise the copolyamide has an excessively high melting point and melts only with decomposition, which is undesirable.

It should therefore be ensured that the partly aromatic copolyamides have a triamine content of less than 0.5, preferably less than 0.3, % by weight.

Partly aromatic copolyamides prepared by most known processes (cf. U.S. Pat. No. 4,603,166) have triamine contents which are more than 0.5% by weight, which leads to a deterioration in product quality and to problems in continuous production. An example of a triamine which causes these problems is in particular dihexamethylenetriamine, which is formed from the hexamethylenediamine used in the preparation.

Copolyamides having a low triamine content have, with the same solution viscosity, lower melt viscosities in comparison with products of the same composition which have a higher triamine content. This considerably improves both the processability and the product properties.

The melting points of the partly aromatic copolyamides are from 270° to 325° C. preferably from 280° to 310° C., these high melting points also being associated with high glass transition temperatures of, as a rule, greater than 75° C. in particular greater than 85° C. (in the dry state).

Binary copolyamides based on terephthalic acid, hexamethylenediamine and ε-caprolactam containing about 70% by weight of units which are derived from terephthalic acid and hexamethylenediamine have a melting point of 300° C. and (in the dry state) a glass transition temperature greater than 110° C.

Binary copolyamides based on terephthalic acid, adipic acid and hexamethylenediamine reach a melting point of 300° C. or more with a lower content (for example about 55% by weight of units of terephthalic acid and hexamethylenediamine (HMD)), the glass transition temperature being not quite as high as in the case of binary copolyamides which contain ε-caprolactam instead of adipic acid or adipic acid/HMD.

The preparation of partly aromatic copolyamides having high heat distortion resistance and good mechanical properties is described, for example, in German Laid-Open Application DOS 3,723,688.

The preferred partly aromatic copolyamides have a crystallinity of more than 10%, preferably more than 15%, in particular more than 20%.

The crystallinity is a measure of the proportion of crystalline fragments in the copolyamide and is determined by X-ray diffraction.

The preferred partly aromatic copolyamides having a low triamine content are advantageously obtained by the processes described in EP-A 129 195 and 129 196.

The relative viscosity of the partly aromatic copolyamides is in general from 2.2 to 5.0, preferably from 2.3 to 4.5, measured in 1% strength by weight solution in 96% strength by weight $H_2SO_4$ at 23° C.

Mixtures of different copolyamides can of course also be used as copolyamide $B_I$, any mixing ratio being possible.

Components $B_{II}$ of the mixture are polymeric impact modifiers.

Particularly suitable polymeric impact modifiers are those which are compatible with the partly aromatic copolyamides $B_I$.

Polymers which increase the toughness of the polyamides generally have two essential features: they contain an elastomeric moiety which has a glass transition temperature of less than −10° C., preferably less than −30° C., and they contain at least one functional group which can react with the polyamide. Examples of suitable functional groups are carboxyl, anhydride, ester, carboxamide, carboximide, amino, hydroxyl, epoxy, urethane and oxazolyl groups.

Examples of polymers $B_{II}$ are ethylene/propylene (EP) and ethylene/propylene/diene (EPDM) rubbers which have been grafted with the abovementioned functional groups. Suitable graft reagents are, for example, maleic anhydride, itaconic acid, acrylic acid, glycidyl acrylate and glycidyl methacrylate. These monomers may be grafted onto the polymer in the melt or in solution in the presence or absence of a free radical initiator, such as cumyl hydroperoxide.

Further examples are copolymers of α-olefins. The α-olefins are usually monomers of 2 to 8 carbon atoms, preferably ethylene and propylene. Alkyl acrylates or alkyl methacrylates which are derived from alcohols of 1 to 8 carbon atoms, preferably from ethanol, butanol or ethylhexanol, and reactive comonomers, such as acrylic acid, methacrylic acid, maleic acid, maleic anhydride or glycidyl (meth)acrylate, and furthermore vinyl esters, in particular vinyl acetate, have proven suitable comonomers. Mixtures of different comonomers can also be used. Copolymers of ethylene with ethyl or n-butyl acrylate and acrylic acid and/or maleic anhydride have proven particularly suitable.

The copolymers can be prepared in a high pressure process at from 400 to 4,500 bar or by grafting the comonomers onto the poly-α-olefin. The amount of the α-olefin in the copolymer is in general from 99.95 to 55% by weight.

A further group of suitable elastomers comprises core/shell graft rubbers. These are graft rubbers prepared in emulsion and consisting of at least one rigid and one flexible component. A rigid component is usually understood as meaning a polymer having a glass transition temperature of at least 25° C., while a flexible component is understood as meaning a polymer having a glass transition temperature of not more than 0° C. These products have a structure comprising a core and at least one shell, the structure arising through the order of addition of the monomers. The flexible components are derived in general from butadiene, isoprene, alkyl acrylates or alkyl methacrylates and, if required, further comonomers. Examples of suitable comonomers here are styrene, acrylonitrile and crosslinking or graftlinking monomers having more than one polymerizable double bond, such as diallyl phthalate, divinylbenzene, butanediol diacrylate or triallyl (iso)cyanurate. The rigid components are derived in general from styrene, α-methylstyrene and copolymers thereof, preferred comonomers here being acrylonitrile, methacrylonitrile and methyl methacrylate.

Preferred core/shell graft rubbers contain a flexible core and a rigid shell or a rigid core, a first flexible shell and at least one further rigid shell. Functional groups, such as carbonyl, carboxyl, anhydride, amido, imido, ester, amino, hydroxyl, epoxy, oxazolyl, urethane, urea, lactam or halobenzyl groups, are preferably incorporated by adding suitable functionalized monomers during the polymerization of the final shell. Examples of suitable functionalized monomers are maleic acid, maleic anhydride, mono- or diesters of maleic acid, tert-butyl (meth)acrylate, (meth)acrylic acid, glycidyl (meth)acrylate and vinyloxazoline. The amount of monomers with functional groups is in general from 0.1 to 25, preferably from 0.25 to 15, % by weight, based on the total weight of the core/shell graft rubber. The weight ratio of flexible to rigid components is in general from 1:9 to 9:1, preferably from 3:7 to 8:2.

Such rubbers which increase the toughness of polyamides are known per se and are described, for example, in EP-A 208 187.

A further group of suitable impact modifiers are thermoplastic polyester elastomers. Polyester elastomers are understood as meaning segmented copolyetheresters which contain long-chain segments which are derived, as a rule, from poly(alkylene) ether glycols and short-chain segments which are derived from low molecular weight diols and dicarboxylic acids. Such products are known per se and are described in the literature, for example in U.S. Pat. No. 3,651,014. Corresponding products are also commercially available under the names Hytrel® (Du Pont), Arnitel® (Akzo) and Pelprene® (Toyobo Co. Ltd.).

Mixtures of different polymers may of course also be used as $B_{II}$.

Component B is obtained by conventional processes, by mixing starting materials $B_I$ and $B_{II}$ in conventional mixing apparatuses, such as a screw extruder, preferably a twin-screw extruder, a Brabender mill, a Banbury mill or a kneader, and then extruding the mixture. After extrusion, the extrudate is cooled and comminuted. Component B is prepared in general using average mixing times of from 0.2 to 10 minutes at from 280° to 320° C.

In addition to components (A) and (B) described, the novel molding materials may also contain from 0 to 40% by weight of further additives (C), such as flameproofing agents and stabilizers.

The novel molding materials usually contain, as stabilizers, either an aromatic secondary amine or a phosphorus compound or both. The aromatic secondary amine is used, for example, in amounts of from 0.1 to 2, preferably from 0.5 to 1.5, in particular from 0.7 to 1, % by weight, based on the amount of component $B_I$. Suitable amines of this type can be described, for example, by the general formula

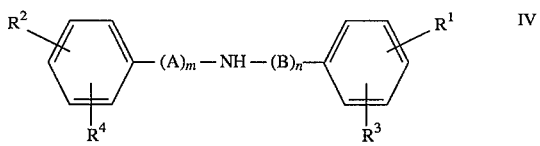

where m and n are each 0 or 1,

A and B are each tertiary carbon substituted by $C_1$-$C_4$-alkyl or by phenyl, $R^1$ and $R^2$ are each hydrogen or $C_1$-$C_6$-alkyl in the ortho or para position, which may be substituted by 1 to 3 phenyl radicals, halogen, a carboxyl group or a transition metal salt of a carboxyl group and $R^3$ and $R^4$ are each hydrogen or methyl in the ortho or para position when the sum of m and n is 1, or are each tertiary $C_3$-$C_9$-alkyl in the ortho or para position which may be substituted by 1 to 3 phenyl radicals when the sum of m and n is 0 or 1.

Preferred radicals A or B are symmetrically substituted tertiary carbon atoms, dimethyl-substituted tertiary carbon atoms being particularly preferred. Tertiary carbon atoms which have 1 to 3 phenyl groups as substituents are also preferred.

Preferred radicals $R^1$ or $R^2$ are para tert-butyl or tetramethyl-substituted n-butyl, it being possible for the methyl groups to be replaced preferably by 1 to 3 phenyl groups. Preferred halogen atoms are chlorine and bromine. Transition metals are, for example, copper and nickel, which can form carboxyl transition metal salts with $R^1$ or $R^2$.

Preferred radicals $R^3$ or $R^4$ are hydrogen when m plus n=2, and tert-butyl in the ortho or para position which may be substituted in particular by 1 to 3 phenyl radicals when m plus n=0 or 1.

Examples of suitable secondary aromatic amines are described in the previously unpublished German Patent Application P 41 12 324.7.

Preferred secondary aromatic amines are diphenylamine and its derivatives, which are commercially available (for example Naugard® from Uniroyal).

The novel molding materials moreover contain, for example, from 100 to 2,000, preferably from 200 to 500, in particular from 200 to 400, ppm of at least one phosphorus-containing inorganic acid or a derivative thereof (based on the polyamide $B_I$ in the molding material).

Preferred acids are hypophosphorous acid, phosphorous acid or phosphoric acid and their salts with alkali metals, sodium salts and potassium salts being particularly preferred. Preferred mixtures are in particular those of hypophosphorous and phosphorous acid or their alkali metal salts in a weight ratio of from 3:1 to 1:3. Organic derivatives of the phosphorus-containing inorganic acids are preferably to be understood as meaning ester derivatives thereof.

The novel thermoplastic molding materials can be prepared by conventional processes, by mixing the starting components (A) and (B) in a conventional mixing apparatus, such as a screw extruder, preferably a twin-screw extruder, a Brabender mill, a Banbury mill or a kneader, and then extruding the mixture. After extrusion, the extrudate is cooled and comminuted.

In order to obtain a very homogeneous molding material, thorough mixing is advantageous. Average mixing times of from 0.2 to 30 minutes at from 280° to 380° C. are generally required for this purpose.

If a component C is added to the molding materials, the order in which the components A, B and C are mixed can be varied. Thus, two of the components A, B and C may be premixed or all components can be mixed together.

The novel molding materials possess good toughness, high heat distortion resistance and excellent flow.

Owing to their high heat distortion resistance and good mechanical properties, the novel molding materials are suitable for the production of moldings, in particular for electrical and electronic components. However, the novel molding materials can also be processed to films or fibers. The high heat distortion resistance in combination with good resistance to chemicals also permits application in the chemical industry, for example plant construction, or in the area of medical technology.

EXAMPLES

Component $A_1$ $A_1$: Polyaryl ether having a predominant base structure corresponding to the formula (II), characterized by a viscosity number VN of 64 ml/g, measured in 1% strength by weight solution in 1:1 phenol/1,2-dichlorobenzene at 25° C.

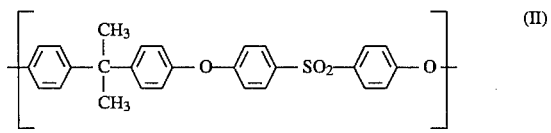

(II)

$A_2$: Polyaryl ether having a predominant base structure corresponding to the formula (III), characterized by a VN of 59 ml/g, measured in 1% strength by weight solution in 1:1 phenol/1,2-dichlorobenzene at 25° C.

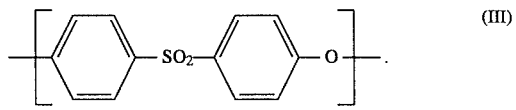

(III)

Component B

The following were used as starting materials for the preparation of component B:

$B_{I.1*}$ Partly aromatic copolyamide, obtainable by reacting the following monomers
34.09 mol % of terephthalic acid
31.82 mol % of ε-caprolactam and
34.09 mol % of hexamethylenediamine
and having a relative viscosity of 2.4 (measured in 1% strength by weight solution in 96% strength sulfuric acid at 25° C.).

$B_{II.1*}$ Ethylene/propylene rubber, grafted with 0.7% by weight of maleic acid and/or maleic anhydride and characterized by a melt flow index of 3 g/10 min (measured at 2.16 kg, 230° C.).

PA* Aliphatic polyamide obtained from 1,6-diaminohexane and adipic acid having a K value (according to Fikentscher) of 76; corresponding to a relative viscosity $\eta_{rel}$ of 2.95, measured in 1% strength by weight solution in 96% strength sulfuric acid at 25° C.

The following toughened partly aromatic copolyamides B or the following toughened aliphatic polyamide PA were or was prepared by melt compounding in a twin-screw extruder (ZKS 30 from Werner and Pfleiderer) at a melt temperature of 310° C.:

TABLE 1

|  | $B_{I.1}$ | $B_{II.1}$ | PA |
| --- | --- | --- | --- |
| $B_{I.1*}$ [% by weight] | 92 | 84 | — |
| $B_{II.1*}$ [% by weight] | 8 | 16 | 16 |
| PA* [% by weight] | — | — | 84 |

Preparation of the Molding Materials

The components were mixed in a twin-screw extruder at a melt temperature of from 310° to 350° C. The melt was passed through a water bath and granulated.

The polyamides used (component $B_1$ or $B_2$ and PA) each contained 1% by weight, based on the amount of polyamides in the blend, of 4,4'-bis(α,α-dimethylbenzyl)diphenylamine (Naugard® 445 from Uniroyal) and 500 ppm of $NaH_2PO_3.5H_2O$ (commercial product from Merck).

The dried granules were injection molded at from 310° to 330° C. to give circular disks and standard small bars.

The heat distortion resistance of the samples was determined by means of the Vicat softening temperature. The Vicat softening temperature was determined according to DIN 53,460, under a force of 49.05 N and with a temperature increase of 50 K per hour, for standard small bars.

The toughness of the samples was determined on the basis of the total penetration energy. The total penetration energy was determined according to DIN 53,443 for circular disks.

The moduli of elasticity, which indicate the rigidity of the samples, were determined according to DIN 53,457-3 for dumbbells. The composition of the molding materials and the results of the measurements are shown in Tables 2 and 3.

TABLE 2

| | Molding material | | | | | | | | | | |
| --- | --- | --- | --- | --- | --- | --- | --- | --- | --- | --- | --- |
| | According to the invention | | | | | | | For comparison | | | |
| | No. | | | | | | | | | | |
| | 1 | 2 | 3 | 4 | 5 | 6 | 7 | 8 | 9 | 10 | 11 |
| Component [% by weight] | | | | | | | | | | | |
| $A_1$ | 85 | 75 | 65 | 40 | 85 | 75 | 65 | 75 | 65 | 65 | 65 |
| $B_{I.1}$ | 15 | 25 | 35 | 60 | — | — | — | — | — | — | — |
| $B_{II.1}$ | — | — | — | — | 15 | 25 | 35 | — | — | — | — |
| PA | — | — | — | — | — | — | — | 25 | 35 | — | — |
| $B_{I.1*}$ | — | — | — | — | — | — | — | — | — | 32.2 | 29.4 |
| $B_{II.1*}$ | — | — | — | — | — | — | — | — | — | 2.8 | 5.6 |

TABLE 2-continued

| | Molding material | | | | | | | | | | |
|---|---|---|---|---|---|---|---|---|---|---|---|
| | According to the invention No. | | | | | | | For comparison | | | |
| | 1 | 2 | 3 | 4 | 5 | 6 | 7 | 8 | 9 | 10 | 11 |
| Total penetration energy (Nm) | 54 | 48 | 46 | 47 | 58 | 53 | 53 | 12 | 6 | 2 | 2 |
| $T_{Vicat}$ [°C] | 180 | 177 | 173 | 162 | 178 | 175 | 172 | 169 | 165 | 172 | 171 |
| Modulus of elasticity [N/mm²] | 2800 | 2820 | 2820 | 2840 | 2700 | 2640 | 2600 | 2400 | 2300 | 2650 | 2460 |

TABLE 3

| | Molding material | | | | | | | | | | |
|---|---|---|---|---|---|---|---|---|---|---|---|
| | According to the invention No. | | | | | | | For comparison | | | |
| | 12 | 13 | 14 | 15 | 16 | 17 | 18 | 19 | 20 | 21 | 22 |
| Component [% by weight] | | | | | | | | | | | |
| $A_2$ | 85 | 75 | 65 | 40 | 85 | 75 | 65 | 75 | 65 | 65 | 65 |
| $B_{I.1}$ | 15 | 25 | 35 | 60 | — | — | — | — | — | — | — |
| $B_{II.1}$ | — | — | — | — | 15 | 25 | 35 | — | — | — | — |
| PA | — | — | — | — | — | — | — | 25 | 35 | — | — |
| $B_{I.1*}$ | — | — | — | — | — | — | — | — | — | 32.2 | 29.4 |
| $B_{II.1*}$ | — | — | — | — | — | — | — | — | — | 2.8 | 5.6 |
| Total penetration energy (Nm) | 60 | 53 | 51 | 50 | 62 | 59 | 57 | 9 | 3 | 1 | 1 |
| $T_{Vicat}$ [°C] | 210 | 208 | 207 | 206 | 208 | 204 | 202 | 199 | 196 | 205 | 200 |
| Modulus of elasticity [N/mm²] | 2830 | 2840 | 2840 | 2860 | 2750 | 2720 | 2700 | 2500 | 2350 | 2650 | 2480 |

As shown by the Examples, the novel molding materials surprisingly have greater toughnesses and also substantially higher rigidities than the blends which contain a toughened polyamide (Examples 8, 9, 19 and 20) as well as the blends which contain the polyaryl ether, the partly aromatic copolyamide and the rubber as individual components (Examples 10, 11, 21 and 22). The novel molding materials furthermore possess good heat distortion resistances.

We claim:

1. A molding material composed of
A) from 40 to 85% by weight of a polyaryl ether (A) having repeated structural elements

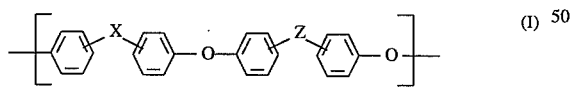  (I)

or the $C_1$-$C_6$-alkyl, $C_1$-$C_6$-alkoxy, aryl, chlorine or fluorine derivatives thereof which are substituted in the nucleus, where X is —$SO_2$—, —SO—, —S—, —O—, —CO—, —N=N—, —RC=$CR^a$—, $CR^bR^c$— or a chemical bond, Z is selected from the group consisting of —$SO_2$—, —SO—, —CO—, —N=N— and RC=$CR^a$, R and $R^a$ are each hydrogen or $C_1$-$C_6$-alkyl and $R^b$ and $R^c$ are each hydrogen or $C_1$-$C_6$-alkyl, $C_4$-$C_{10}$-cycloalkyl, $C_1$-$C_6$-alkoxy or aryl or a fluorine or chlorine derivative of each of these, and B) from 15 to 60% by weight of a mixture (B) of
$B_I$ from 75 to 97% by weight of partly aromatic polyamides having a triamine content of less than 0.5% by weight and $B_{II}$ from 3 to 25% by weight of polymeric impact modifiers containing at least one functional group which can react with the polyamide component $B_I$, and which components $B_I$ and $B_{II}$ are premixed in the molten state before the mixture is combined with component A, C) from 0 to 40% by weight of additives of processing assistants.

2. A molding material as defined in claim 1, in which the polyaryl ether (A) contains $a_1$) from 5 to 95 mol % of repeating units

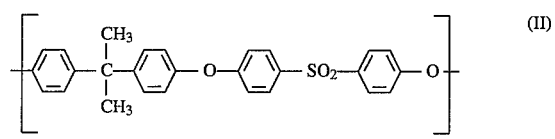  (II)

$a_2$) from 5 to 95 mol % of repeating units

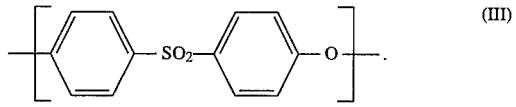  (III)

3. A molding material as defined in claim 1, which contains, as polyaryl ether A, a mixture of $A_I$) from 0.5 to 50% by weight of polyaryl ethers containing terminal amino groups and A$_{II}$) from 50 to 99.5% by weight of a polyaryl ether having terminal groups which are not amino groups.

4. A molding material as defined in claim 1, in which the partly aromatic polyamides (B$_I$) are composed of B1: from 20 to 90% by weight of units which are derived from terephthalic acid and hexamethylenediamine and B2: from 10 to 80% by weight of units of at least one of the building blocks B21, B22 or B23, ie.

B21: from 0 to 50% by weight of units which are derived from ε-caprolactam,

B22: from 0 to 80% by weight of units which are derived from adipic acid and hexamethylenediamine and B23: from 0 to 40% by weight of further polyamide-forming monomers.

5. A molding material as defined in claim 1, in which the partly aromatic polyamides (B$_I$) are composed of B1) from 50 to 80% by weight of units which are derived from terephthalic acid and hexamethylenediamine and B21) from 20 to 50% by weight of units which are derived from ε-caprolactam.

6. A molding material as defined in claim 1, in which ethylene/propylene copolymers or ethylene/propylene rubbers, grafted with at least one grafting reagent selected from the group consisting of maleic acid, maleic anhydride, itaconic acid, acrylic acid, glycidyl acrylate and glycidyl methacrylate, are present as polymeric impact modifiers (B$_{II}$).

7. A molding material as defined in claim 1, in which copolymers of α-olefins of 2 to 8 carbon atoms and $C_1$-$C_8$-alkyl acrylates or $C_1$-$C_8$-alkyl methacrylates or vinyl $C_2$-$C_8$-esters are present as polymeric impact modifiers (B$_{II}$).

8. A molding, film or fiber obtained from a molding material as defined in claim 1.

* * * * *